A. M. BELLONY.
BRAKE MECHANISM.
APPLICATION FILED MAY 7, 1919.
1,424,440.
Patented Aug. 1, 1922.
2 SHEETS—SHEET 1.
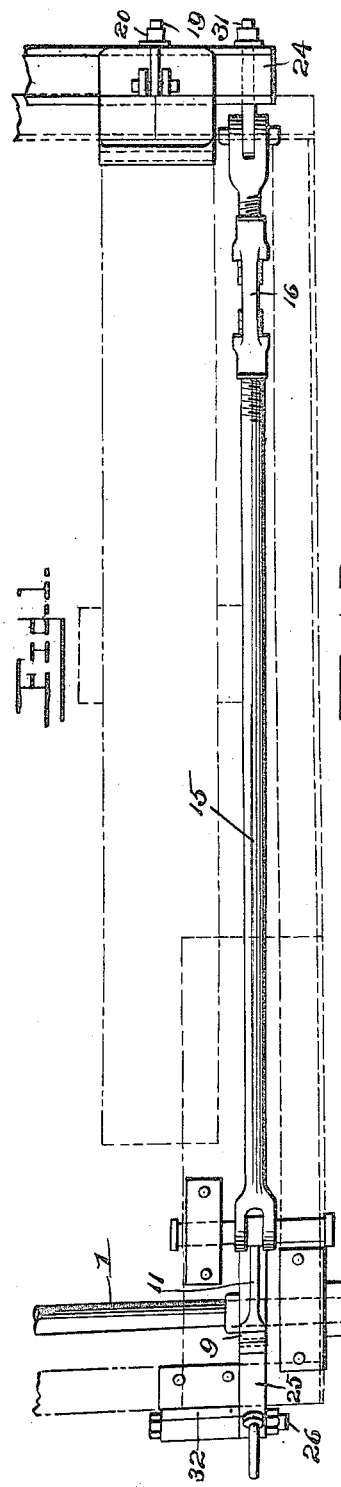
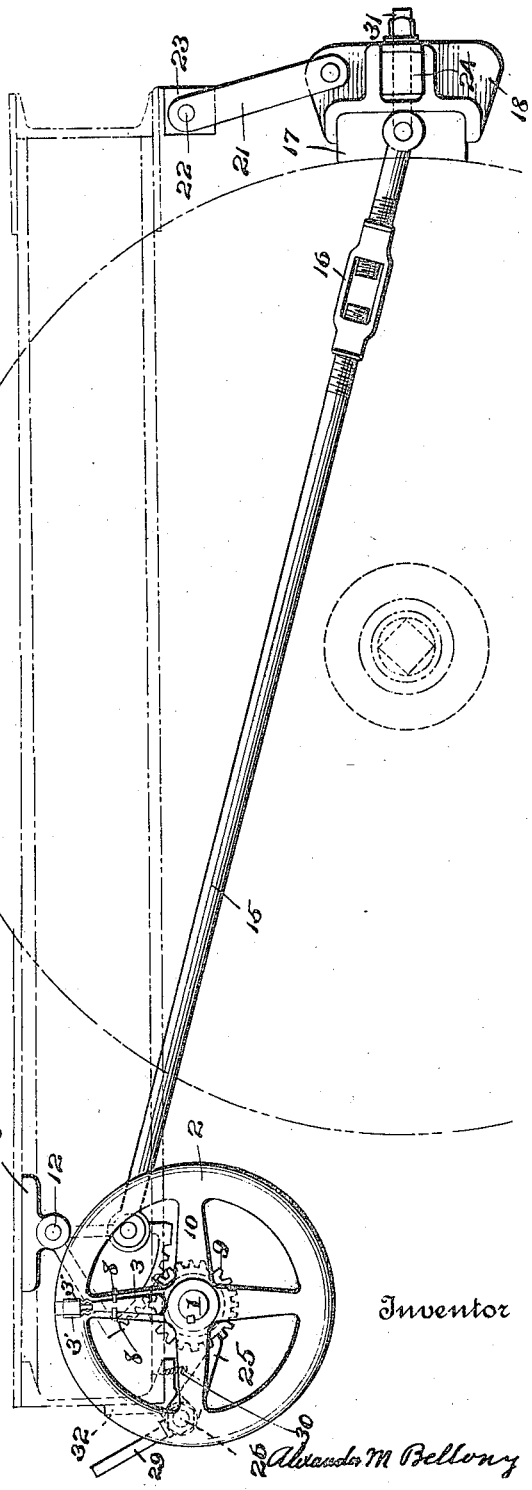
Inventor
Alexander M Bellony

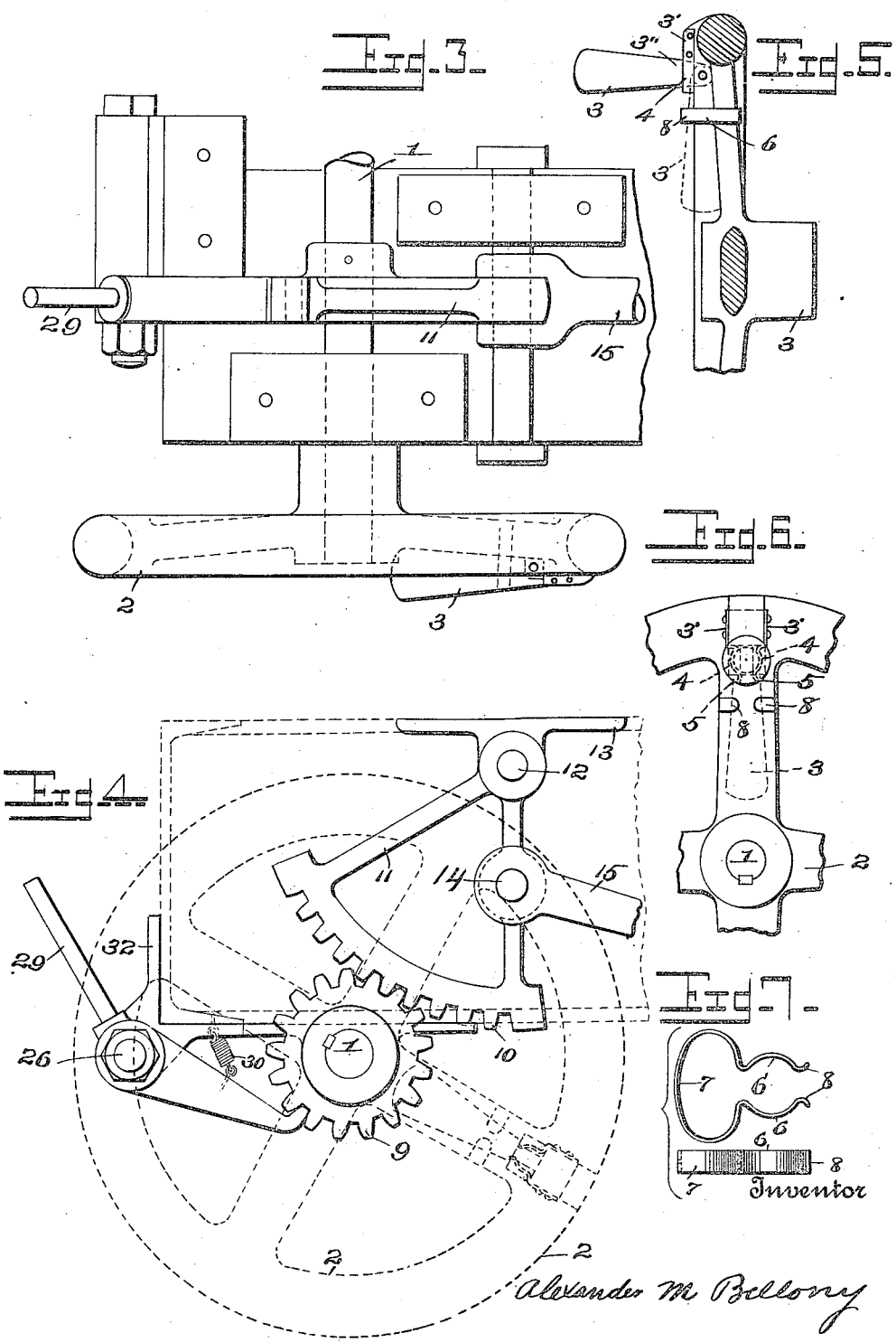

UNITED STATES PATENT OFFICE.

ALEXANDER M. BELLONY, OF THE UNITED STATES ARMY.

BRAKE MECHANISM.

1,424,440.  Specification of Letters Patent.  Patented Aug. 1, 1922.

Application filed May 7, 1919. Serial No. 295,466.

(FILED UNDER THE ACT OF MARCH 3, 1883, 22 STAT. L., 625.)

*To all whom it may concern:*

Be it known that I, ALEXANDER M. BELLONY, captain, Corps of Engineers, United States Army, a citizen of the United States, stationed at Washington, District of Columbia, have invented an Improvement in Brake Mechanism, of which the following is a specification.

The invention described herein may be used by the Government, or any of its officers or employees in prosecution of work for the Government, or by any other person in the United States, without payment of any royalty thereon.

The object of my invention is to provide a novel brake mechanism, which is particularly designed for use in connection with mobile pile-driving machines, to brake the wheels thereof for the purpose of retarding the movement of the machine or to hold it stationary when operating to drive piles, but which is not restricted to such use; and which, while primarily intended for control by the operator from the brake platform at the rear of the machine, may, in an emergency, be operated from either side of the machine.

Another object is to provide a braking mechanism of the character noted which is characterized by extreme simplicity in construction and smoothness and positiveness of action in use.

With these objects in view, the invention resides in the novel construction, combination and arrangement of parts of a braking mechanism, as will be hereinafter fully described in the specification, summed up in the claims, and illustrated in the accompanying drawings.

The drawings forming part of this application comprise the following views:

Figure 1 is a fragmentary plan view of the brake mechanism;

Figure 2 is a side elevation of the same;

Figure 3 is an enlarged plan view of the hand wheel and its mounting;

Figure 4 is a side elevation of the brake operating mechanism the hand wheel shown in dotted lines;

Figure 5 is a fragmentary cross-section of the hand wheel;

Figure 6 is a fragmentary view in elevation of the hand wheel showing the operating handle therefor; and Figure 7 shows a plan view and side elevation of the handle retaining clip.

Referring now, in detail to the drawings:

1 designates an oscillatory shaft, which is properly supported in suitable bearings carried at each side of the rear end of the vehicle frame, and which carries, at each end, a hand wheel 2, one of which may be operated from the brake platform at the rear of the machine, and either of which may be used in an emergency, by a person standing at the side of the machine for actuating the brake mechanism.

Each of said wheels 2 preferably carries a collapsible handle 3, which is pivoted, at one end, to the wheel eccentrically thereof, so as to occupy a position substantially at right angles to the plane of said wheels, or parallel therewith. The handle is adapted to be yieldingly held in either of said positions by suitable means. In this instance, spring arms 3', 3' are secured to the wheel, (Fig. 6) adjacent the pivotal point of said handle, and are supported in a plane parallel with the wheel. Said arms are provided with complemental curved portions 4, and oppositely bent terminals 5. In operation, when the handle is moved from a folded or inoperative position to a position at right angles to the plane of the wheel, the reduced stem 3'' of the handle forces the bent terminals 5, 5 of the spring arms away from each other, and passes between the bowed portions 4, 4 of said spring arms, whereupon said terminals 5, 5 move toward each other, thus yieldingly holding the handle in a horizontal position, against accidental movement toward a vertical position.

To hold the handle yieldingly in a vertical position, there are provided bowed spring arms 6, 6 preferably formed from a single length of spring strip metal bent to form a substantially elliptical base portion 7, apertured for securing the same to one of the spokes of the wheel 2. The spring arms 6, 6 are provided with outwardly curved terminals 8, 8. This holding device is positioned at right angles to the plane of the wheel and in the path of movement of said handle 3 from a horizontal to a vertical position, so that, in swinging the handle from a horizontal to a vertical position, it passes between the terminals 8, 8, forcing them apart and, when the handle passes between the bowed portions of said arms, the terminals and spring arms spring toward each other, thus yieldingly holding the handle against accidental movement.

Carried by the shaft 1, toward each end thereof, are ratchet-wheels 9 (Fig. 4.) Adapted to engage each ratchet-wheel is a segmental rack 10 carried by a segment 11 pivoted at its apex, as shown at 12, to a bracket 13 carried by the vehicle frame. The rack terminates short of both ends of the segment. Pivoted at one end, as shown at 14, to said segment is a connecting rod 15, preferably formed in two sections united by turnbuckle 16, to take up wear. The other end of said connecting rod is pivoted to an eye-bolt 31 passing through a brake-beam 24 carrying brake shoes 18, 18, provided with shoe-blocks 17, 17, secured thereto by suitable means, as a bolt 19 carrying a nut 20. Each brake shoe is pivoted to one end of the supporting link 21, which, at its other end, is pivoted as at 22 to a bracket 23, carried by the vehicle frame.

Suitable means are provided for preventing the wheels 2, 2, from rotating in a direction to release the wheel braking blocks 17, 17, after the same have been thrown into braking relation with said wheels. In this instance, said means act upon one of the ratchet-wheels 9, and preferably comprises a dog, or pawl, 25, which is mounted for oscillatory movement on a shaft 26 supported in bearings in a bracket 32 secured to the vehicle frame. The pawl is provided with a threaded recess 27, into which is screwed the threaded end 28 of a rod 29. A spring 30 is secured to the pawl and to the vehicle, and keeps the pawl in engagement with the ratchet-wheel. The rod 29 also acts as a counterbalance, or weight, to keep the pawl in engagement with the ratchet-wheel.

In operation, the pawl trails over the teeth of the ratchet-wheel when the wheel 2 is rotated in the direction to brake the wheels of the machine and prevents retrograde movement of the ratchet-wheel, after the vehicle wheels have been braked.

The degree of rotation of the wheels 2, 2 is limited by the length of the racks 10, 10.

The general operation of the braking mechanism is obvious: When the wheels 2, 2 are rotated, the ratchet-wheels 9, 9, by engagement with the racks 10, 10, rock the segments 11, 11 on their pivots 12, 12, thus throwing the connecting rods 15, 15 to move the brake-blocks 17, 17 into contact with the wheels.

The locking-dog 25 locks the ratchet-wheels against retrograde movement, thus automatically locking the brakes in braking position.

Having thus fully described my invention, what I claim as new and desire to secure by Letters Patent of the United States, is:

1. A control mechanism comprising a rotatable member including a circular hand-grip, and an auxiliary grip pivoted to the hand-grip, said auxiliary grip being operable to positions coincident with or at right angles to the plane of said rotatable member, and spring clips attached to said member and engageable with the auxiliary grip to secure the latter in either of its positions.

2. A control mechanism comprising a rotatable member including a hub, radiating spokes, a circular hand-grip connected thereto, and an auxiliary grip pivoted to the hand-grip, said auxiliary grip being operable to positions coincident with or at right angles to the plane of said rotatable member, and a spring clip attached to the circular grip and to one of said spokes in the plane of movement of said auxiliary grip for engagement therewith to rigidly secure said auxiliary grip in either of its positions.

ALEXANDER M. BELLONY.